United States Patent
Chengalvarayan

(10) Patent No.: US 6,292,776 B1
(45) Date of Patent: Sep. 18, 2001

(54) HIERARCHIAL SUBBAND LINEAR PREDICTIVE CEPSTRAL FEATURES FOR HMM-BASED SPEECH RECOGNITION

(75) Inventor: Rathinavelu Chengalvarayan, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/266,958

(22) Filed: Mar. 12, 1999

(51) Int. Cl.[7] .................................................. G10L 19/04
(52) U.S. Cl. ...................... 704/219; 704/220; 704/231; 704/236; 704/239
(58) Field of Search ................................. 704/219, 231, 704/239, 243, 249, 250

(56) References Cited

U.S. PATENT DOCUMENTS

| | | | |
|---|---|---|---|
| 5,271,088 | * 12/1993 | Bahler ................................. | 704/201 |
| 5,590,242 | * 12/1996 | Juang et al. ......................... | 704/245 |
| 5,765,124 | * 6/1998 | Rose et al. ........................... | 704/242 |
| 5,806,022 | * 9/1998 | Rahim et al. ........................ | 704/205 |
| 5,864,806 | * 1/1999 | Mokbel et al. ...................... | 704/234 |
| 5,867,816 | * 2/1999 | Nussbaum ........................... | 704/232 |
| 5,930,753 | * 6/1999 | Potamianos et al. ................ | 704/256 |
| 6,064,958 | * 5/2000 | Takahashi et al. .................. | 704/243 |
| 6,112,175 | * 8/2000 | Chengalvarayan ................... | 704/256 |
| 6,157,909 | * 12/2000 | Mauuary et al. .................... | 704/228 |

FOREIGN PATENT DOCUMENTS

674306A2   3/1995   (EP).

OTHER PUBLICATIONS

Tokuda et al, "A Very Low Bit Rate Speech Coder Using HMM–based Speech Recognition/Synthesis Techniques", IEEE Acoustics, Speech and Signal Processing, vol. 2 pp 609–612, Jun. 1998.*

Strope et al, "Robust Word Recognition Using Threaded Spectral Pairs", Proceedings of the 1998 IEEE International Conference on Acoustics, Speech, and Signal Processing, vol. 2 pp625–628, Jun. 1998.*

Nadeu et al, "Frequency and Time Filtering of Filter–Bank Energies for HMM Speech Recognition", Spoken Language, 1996, ICSLP, pp 430–433, vol. 1.*

McCourt, et al.: "Multi–Resolution Cepstral Features For Phoneme Recognition Across Speech Sub–Bands" IEEE International Conference On Acoustics, Speech And Processing—X{000854639—May 15, 1998.

A. Hermansky: "Perceptual Linear Predictive (PLP) Analysis Of Speech"—Journal Of The Acoustical Society Of America, US, American Institute of Physics— XP000110674—Apr. 1, 1990.

H. Bourlard & S. Dupont, "Subband–Based Speech Recognition", Proc. ICASSP, 1997, pp. 1251–1254.

W. Chou, M. G. Rahim & E. Buhrke, "Signal Conditioned Minimum Error Rate Training", Proc. Eurospeech, 1995, pp. 495–498.

T. Eisele, R. Haeb–Umbach & D. Langmann, "A Comparative Study Of Linear Feature Transformation Techniques For Automatic Speech Recognition", Proc. ICSLP, 1996, pp. 252–255.

H. Hermansky, "Perceptual Linear Predictive (PLP) Analysis Of Speech", Journal Of Acoustical Society Of America, vol. 87, No. 4, 1990, pp. 1738–1752.

(List continued on next page.)

Primary Examiner—Fan Tsang
Assistant Examiner—Michael N. Opsasnick
(74) Attorney, Agent, or Firm—J. R. Penrod

(57) ABSTRACT

A method and apparatus for first training and then recognizing speech. The method and apparatus use subband cepstral features to improve the recognition string accuracy rates for speech inputs.

20 Claims, 2 Drawing Sheets

OTHER PUBLICATIONS

B. H. Juang & L. R. Rabiner, "The Segmental K-means Algorithm For Estimating Parameters Of Hidden Markov Models", *IEEE Transactions On Acoustics Speech and Signal Processing*, vol. 38, No. 9, 1990, pp. 1639–1641.

P. McCourt, S. Vaseghi & N. Harte, "Multi-Resolutional Cepstral Features For Phoneme Recognition Across Speech Subbands", *Proc. ICASSP*, 1998, pp. 557–560.

B. H. Juang, W. Chou & C. H. Lee, "Minimum Classification Error Rate Methods For Speech Recognition", *IEEE Transactions On Speech And Audio Processing*, vol. 5, No. 3, 1997, 257–265.

E. McDermott & S. Katagiri, String-Level MCE For Continuous Phoneme Recognition:, *Proc. Eurospeech*, 1997, pp. 123–126.

S. Okawa, E. Bocchieri & A. Potamianos, "Multi-Band Speech Recognition In Noisy Environments", *Proc. ICASSP*, 1998, pp. 641–644.

J. W. Picone, "Signal Modeling Techniques In Speech Recognition", *Proceedings of the IEEE*, vol. 81, No. 9, 1993, pp. 1215–1247.

M. Rahim & B. H. Juang, "Signal Bias Removal By Maximum Likelihood Estimation For Robust Telephone Speech Recognition", *IEEE Transactions On Speech & Audio Processing*, vol. 4, No. 1, 1996, pp. 19–30.

S. Rao & W. A. Pearlman, Analysis Of Linear Prediction, Coding And Spectral Estimation From Subbands, *IEEE Transactions On Information Theory*, vol. 42, 1996, pp. 1160–1178.

H. W. Strube, "Linear Prediction On A Warped Frequency Scale", *Journal Of Acoustical Society Of America*, vol. 68, No. 4, 1980, pp. 1071–1076.

D. L. Thomson & R. Chengalvarayan, "Use Of Periodicity And Jitter As Speech Recognition Features", *Proc. ICASSP*, 1998, pp. 21–24.

S. Tibrewala & H. Hermansky, "Subband Based Recognition Of Noisy Speech", *Proc. ICASSP*, 1997, pp. 1255–1258.

* cited by examiner

HIERARCHIAL SUBBAND LINEAR PREDICTIVE CEPSTRAL FEATURES FOR HMM-BASED SPEECH RECOGNITION

TECHNICAL FIELD

The invention relates to the field of speech recognition and more particularly to a method and apparatus for improved hidden markov model (HMM) based speech recognition.

BACKGROUND OF THE INVENTION

The structure of a typical continuous speech recognizer consists of a front-end feature analysis stage followed by a statistical pattern classifier. The feature vector, interface between these two, should ideally contain all the information of the speech signal relevant to subsequent classification, be insensitive to irrelevant variations due to changes in the acoustic environments, and at the same time have a low dimensionality in order to minimize the computational demands of the classifier. Several types of feature vectors have been proposed as approximations of the ideal speech recognizer, as in the article by J. W. Picone, entitled "Signal Modeling Techniques in Speech Recognition", Proceedings of the IEEE, Vol. 81, No. 9, 1993, pp.1215–1247. Most speech recognizers have traditionally utilized cepstral parameters derived from a linear predictive (LP) analysis due to the advantages that LP analysis provides in terms of generating a smooth spectrum, free of pitch harmonics, and its ability to model spectral peaks reasonably well. Mel-based cepstral parameters, on the other hand, take advantage of the perception properties of the human auditory system by sampling the spectrum at mel-scale intervals. Logically, combining the merits of both LP analysis and mel-filter bank analysis should, in theory, produce an improved set of cepstral features.

This can be performed in several ways. For example, one could compute the log magnitude spectrum of the LP parameters and then warp the frequencies to correspond to the mel-scale. Previous studies have reported encouraging speech recognition results when warping the LP spectrum by a bilinear transformation prior to computing the cepstrum, as opposed to not using the warping such as in M. Rahim and B. H. Juang, "Signal Bias Removal by Maximum Likelihood Estimation for Robust Telephone Speech Recognition", IEEE Transactions on Speech and Audio Processing, Vol. 4, No. 1, 1996, pp. 19–30. Several other frequency warping techniques have been proposed, for example in H. W. Strube, "Linear Prediction on a Warped Frequency Scale", Journal of Acoustical Society of America, Vol. 68, No.4, 1980, pp. 1071–1076, a mel-like spectral warping method through all-pass filtering in the time domain is proposed. Another approach is to apply mel-filter bank analysis on the signal followed by LP analysis to give what will be refereed to as mel linear predictive cepstral (mel-lpc) features (see M. Rahim and B. H. Juang, "Signal Bias Removal by Maximum Likelihood Estimation for Robust Telephone Speech Recognition", EEE Transactions on Speech and Audio Processing}, Vol. 4, No. 1, 1996, pp. 19–30). The computation of the mel-lpc features is similar in some sense to perceptual linear prediction PLP coefficients explained by H. Hermansky, in "Perceptual Linear Predictive (PLP) analysis of Speech", Journal of Acoustical Society of America, Vol. 87, No. 4, 1990, pp. 1738–1752. Both techniques apply a mel filter bank prior to LP analysis. However, the mel-lpc uses a higher order LP analysis with no perceptual weighting or amplitude compression. All the above techniques are attempts to perceptually model the spectrum of the speech signal for improved speech quality, and to provide more efficient representation of the spectrum for speech analysis, synthesis and recognition in a whole band approach.

In recent years there has been some work on subband-based feature extraction techniques, such as H. Bourlard and S. Dupont, "Subband-Based Speech Recognition", Proc. ICASSP, 1997, pp. 1251–1254; P. McCourt, S. Vaseghi and N. Harte, "Multi-Resolution Cepstral Features for Phoneme Recognition Across Speech Subbands", Proc. ICASSP, 1998, pp. 557–560. S. Okawa, E. Bocchieri and A. Potamianos, "Multi-Band Speech Recognition in Noisy Environments", Proc. ICASSP, 1998, pp. 641–644; and S. Tibrewala and H. Hermansky, "Subband Based Recognition of Noisy Speech", Proc. ICASSP, 1997, pp. 1255–1258. The article P. McCourt, S. Vaseghi and N. Harte, "Multi-Resolution Cepstral Features for Phoneme Recognition Across Speech Subbands", Proc. ICASSP, 1998, pp. 557–560 indicates that use of multiple resolution levels yield no further advantage. Additionally, a recent theoretical and empirical results have shown that auto-regressive spectral estimation from subbands is more robust and more efficient than full-band auto-regressive spectral estimation S. Rao and W. A. Pearlman, "Analysis of Linear Prediction, Coding and Spectral Estimation from Subbands", IEEE Transactions on Information Theory, Vol. 42, 1996, pp. 1160–1178.

As the articles cited above tend to indicate, there is still a need for advances and improvements in the art of speech recognizers.

It is an object of the present invention to provide a speech recognizer that has the advantages of both a linear predictive analysis and a subband analysis.

SUMMARY OF THE INVENTION

Briefly stated, an advance in the speech recognizer art achieved by providing an approach for prediction analysis, where the predictor is computed from a number of mel-warped subband-based autocorrelation functions obtained from the frequency spectrum of the input speech. Moreover, a level of sub-band decomposition and subsequent cepstral analysis can be increased such that features may be selected from a pyramid of resolution levels. An extended feature vector is formed based on concatenation of LP cepstral features from each multi-resolution sub-band, defining a large dimensional space on which the statistical parameters are estimated.

In a preferred embodiment, an advance in the art is provided by a method and apparatus for a recognizer based on hidden Markov model (HMM) which uses continuous density mixtures to characterize the states of the HMM. An additional relative advantage is obtained by using a multi-resolution feature set in which the inclusion of different resolutions of sub-band decomposition in effect relaxes the restriction of using a single fixed speech band decomposition and leads to fewer string errors.

In accordance with another embodiment of the invention, an advance in the art is achieved by providing an improved speech recognizer which uses multi-resolution mel-lpc features.

DETAILED DESCRIPTION

Figure 1:
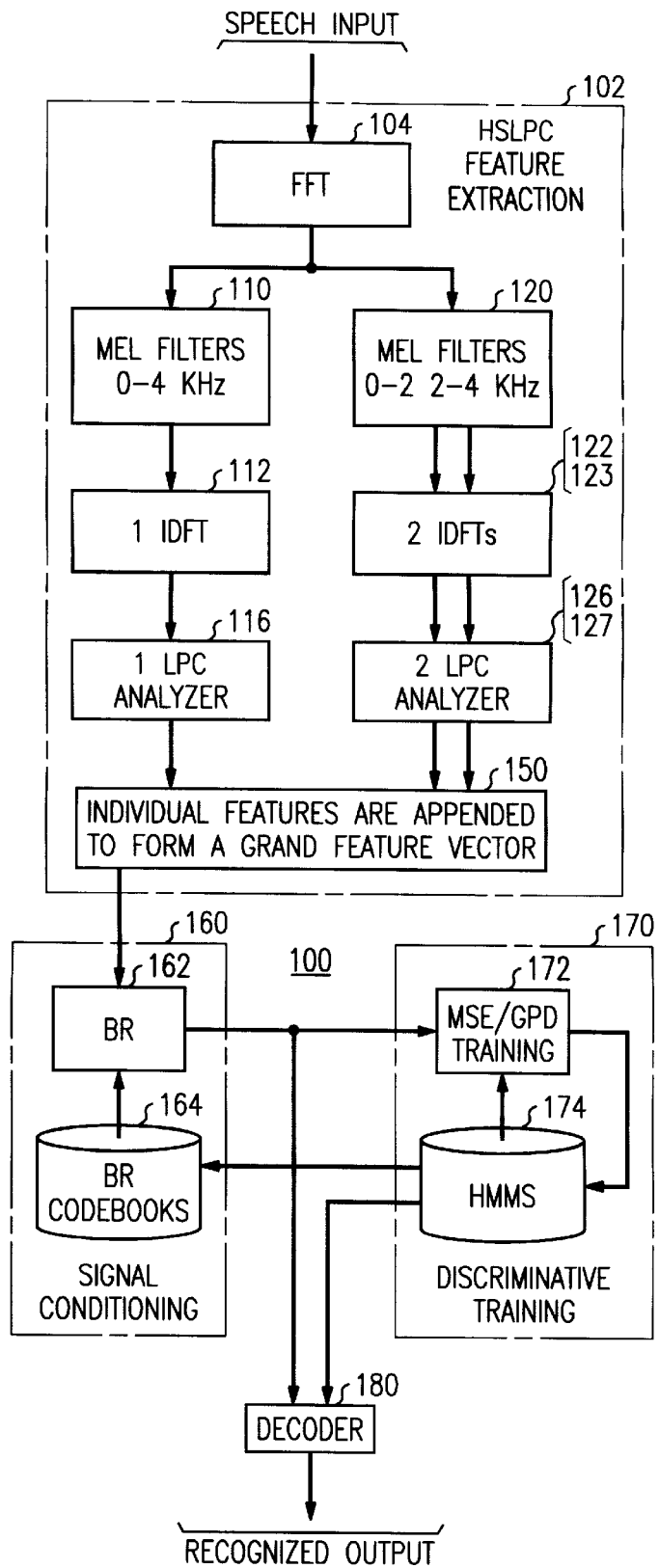
FIG. 1 is a block diagram illustrating the method and apparatus of a speech recognizer for a first and a second level sub-bands according to the invention.

FIG. 1 is a block diagram of hierarchical sub-band linear predictive speech recognizer 100 that has two levels of subbands. The first level is the standard speech bandwidth, for example 0 to 4000 hertz. The second level has two subbands, 0–2000 hertz and 2000–4000 hertz. These bandwidth limits are imposed within a hierarchical sub-band-based linear predictive cepstral (HSLPC) feature extraction process 102. Improved speech recognition is made possible by the set of HSLPC features extracted by process 102 according to the present invention. As is normal for speech recognizers, first the recognizer is trained to build up a speech model, and after the training the speech model is used to recognize input speech. The speech recognizer 100 is first trained with signal conditioned minimum string error rate training.

The invention resulted, in part, from an investigation of the use of correlates to provide more separable features for classification. Although there seemed to be a general notion that more separable features would produce better recognizers, that general notion did not specifically point out that correlates would be a source of separable features, nor did the general notion provide a specific embodiment for using correlates to obtain more separable features.

FIG. 1 shows the overall process of computing the hierarchical mel-lpc features for a frame of speech. The HSLPC feature extraction process 102 is used, along with a signal conditioning process 160 and discriminative training process 170 to train speech recognizer 100 and then to recognize speech inputs with speech recognizer 100. The training process is first described in detail below. Speech recognizer 100 is a process that operates on a digital processor platform such as the one shown in FIG. 1 of U.S. patent application Ser. No. 09/032,902 "SPEAKER ADAPTION USING DISCRIMINATIVE LINEAR REGRESSION ON TIME-VARYING MEAN PARAMETERS IN TRENDED HMM" by R. Chengalvarayan which is hereby incorporated by reference. The digital processor platform of U.S. patent application Ser. No. 09/032,902 can be re-programmed to provide the processes required by speech recognizer 100 of the present invention. First, is HSLPC feature extraction process 102 shown as a dashed block. HSLPC feature extraction process 102 processes input time varying speech. This processing includes pre-emphasis, blocking speech into frames, frame windowing, and Fourier transformations. These particular functions are provided by fast Fourier transform (FFT) 104. FFT 104 converts the input speech time function into a frequency (power) spectrum. Next, are mel-filter banks 110 and 120. The center frequencies of the filters 110, and 120 are spaced equally on a linear scale from 100 to 1000 Hz and equally on a logarithmic scale above 1000 Hz. Above 1000 Hz, each center frequency is 1.1 times the center frequency of the previous filter. Each filter's magnitude frequency response has a triangular shape in the frequency domain that is equal to unity at the center frequency and linearly decreasing to zero at the center frequencies of the two adjacent filters. The frequency domain spectrum for each frame is passed through a set of M triangular mel-filter banks, where M is set to 24 for the recognizer 100.

Second, autocorrelation analysis is performed using inverse discrete Fourier transforms (IDFT) 112, and 122 and 123. The IDFTs are applied to the smoothed power spectrum, i.e. without the log operation, to yield Q autocorrelation coefficients, where Q is set to 10 for level 1. For level 2, Q is set to 8 for lower half and upper half sub-bands (0–2 KHz and 2–4 KHz). FIG. 1 illustrates the sequence of operations in each sub-band for resolution levels 1 and 2. Resolution levels greater than 2 are contemplated, two and three (FIGS. 1 and 2 were simply chosen as convenient examples and are not meant to be limiting in anyway to the invention or claims.

Third, cepstral analysis is performed by linear predictive cepstral analysis processes 116, 126 and 127. Each set of autocorrelation coefficients is converted first to LP coefficients, using Durbin's recursion algorithm known from L. R. Rabiner and Biing-Hwang Juang, "Fundamentals of Speech Recognition", Prentice Hall, N.J., 1993, pp. 115–117, and then converted to cepstral parameters using a standard LP to cepstrum recursion algorithm. The lpc analysis processes is repeated for each level, for example level 1 and 2, and for each sub-band, by units 116, and 126 and 127 respectively. The lpc processes are repeated until the predetermined required number of cepstral features from all the levels is attained. Once the required number of cepstral features from all levels are attained, then the multi-level sub-band features are concatenated to form a single extended feature vector in unit 150. The final dimension of the concatenated cepstral vector is set to 12 in the preferred embodiment of the present invention. In a preferred embodiment, three types of feature sets were examined:

(12,0,0) indicates 12 features from level 1, 0 from lower and 0 from upper subbands.

(0,6,6) indicates 12 features from level 2 (6 features from lower subband and 6 features from upper sub-band), and 0 features from level 1.

(6,3,3) indicates 6 features from level 1 and six features from level 2 (3 features from lower sub-band and 3 features from upper sub-band).

In addition to the 12 HSLPC features, provided by process 102, for each frame of speech, each input feature vector is extended beyond the 12 HSLPC features (and energy) to include the first and second order derivatives. In total, this results in a 39-dimensional feature vector similar to the one in B. H. Juang, W. Chou and C. H. Lee, "Minimum classification error rate methods for speech recognition," IEEE Transactions on Speech and Audio Processing, Vol. 5, No.3, pp. 257–265, 1997 and U.S. patent application Ser. No. 09/032,902 "SPEAKER ADAPTION USING DISCRIMINATIVE LINEAR REGRESSION ON TIME-VARYING MEAN PARAMETERS IN TRENDED HMM" by R. Chengalvarayan which is hereby incorporated by reference. Yet different than those because of the use of sub-band information in 12 of the 39 features.

As with previously known speech recognition systems, in order to train and test the recognizer, a large and complex connected digit (CD) database was used for the preferred embodiment. This CD database is quite challenging for speech recognizers because of its speaker diversity. The CD database used was a compilation of databases collected during several independent data collection efforts, field trials, and live service deployments. The CD database contains the English digits one through nine, zero and oh. This CD databases ranges in scope from one where speakers read prepared lists of digit strings to one where the customers actually use a recognition system to access information about their credit card accounts. These data were collected over wireline network channels using a variety of telephone handsets. Digit string lengths ranged from 1 to 16 digits. As is common, the CD database was divided into two sets: a training set and a testing set. The training set included both read and spontaneous digit input from a variety of network channels, microphones and dialect regions. During training, hierarchical signal bias removal (HSBR) process 162 removed bias from signals having different input conditions. The results of the HSBR process 162 were forwarded to minimum string error/generalized probabilistic decent (MSE/GPD) training and recognition process 172. During training, process 162 and process 172 build up HMMs in memory 174. The HMMs in memory 174 are used to build up HSBR codebooks in memory 164 during training.

Subsequent testing set was designed to contain data strings from both matched and mismatched environmental conditions. All recordings in the training and testing set were valid digit strings, totaling 7461 and 13114 strings for training and testing, respectively. The training and testing was similar to that described in U.S. patent application Ser. No. 09/071,214 filed May 1, 1998 entitled "Use of periodicity and jitter as speech recognition features" by D. L. Thomson and R. Chengalvarayan, which is hereby incorporated by reference.

Following feature analysis, each feature vector is passed to the HMM recognizer which models each word in the vocabulary by a set of left-to-right continuous mixture density HMM using context-dependent head-body-tail models. Each of the signals was recorded under various telephone conditions and with different transducer equipment. After that each HSLPC feature vector created was further processed using a bias removal process to reduce the effects of channel distortion. Preferably, a cepstral mean subtraction bias removal (CMSBR) process is used, with a hierarchical signal bias removal (HSBR) process being an alternative choice. A process similar to HSBR is described in M. Rahim and B. H. Juang, in "Signal Bias Removal by Maximum Likelihood Estimation for Robust Telephone Speech Recognition", IEEE Transactions on Speech and Audio Processing, Vol. 4, No. 1, 1996, pp. 19–30. In another embodiment of the present invention, the bias remover 162 uses HSBR on one part of the grand feature vector, e.g. the features that correspond to a specific level or levels, and CMSBR on the remaining part of the grand feature vector, e.g. the features that correspond to the remaining levels.

Each word in the vocabulary is divided into a head, a body, and a tail segment. To model inter-word co-articulation, each word consists of one body with multiple heads and multiple tails depending on the preceding and following contexts. In the preferred embodiment of the present invention, all possible inter-word co-articulation, resulting in a total of 276 context-dependent sub-word models were modeled.

Both the head and tail models are represented with 3 states, while the body models are represented with 4 states, each having 4 mixture components. Silence is modeled with a single state model having 32 mixture components. This configuration results in a total of 276 models, 837 states and 3376 mixture components. Training included updating all the parameters of the model, namely, means, variances, and mixture gains using maximum-likelihood estimation (MLE) followed by three epochs of minimum string error and generalized probabilistic decent (MSE/GPD) training to further refine the estimate of the parameters. This training is similar to that set forth in U.S. patent application Ser. No. 09/071,214 filed May 1, 1998 entitled "Use of periodicity and jitter as speech recognition features" by D. L. Thomson and R. Chengalvarayan mentioned above. The difference being the HSLPC feature vectors produced by HSLPC feature extraction process 102. The BR codebook of size four is extracted from the mean vectors of HMMs, and each training utterance is signal conditioned by applying HSBR prior to being used in MSE/GPD training. In the training portion of speech recognizer development the number of competing string models was set to four and the step length was set to one. The length of the input digit strings were assumed to be unknown during both training and testing.

After training, several groups of tests were run to evaluate the connected digit recognizer 100 using three types of HMMs (HSLPC_{12,0,0}, HSLPC_{0,6,6} and HSLPC_ {6,3,3}) and two types of training (ML and MSE). These tests were run almost the same as actual operation. For the tests and actual operation, the processing by HSLPC feature extraction unit 102 was the same as in training. The bias removal process 162 is basically the same as training, except that the training will be over and HMMs and the BR codebooks should not be changing with training at this stage. For actual testing and actual speech recognition, the output of the bias remover 162 is transmitted to a decoder process 180. The decoder process 180 also receives HMM from HMM storage 174. The decoder process compares the grand feature vector after any bias has been removed with the HMMs of the recognizer vocabulary that were built during training. This decoder process is very similar to the one used in U.S. patent application Ser. No. 09/071,214, supra.

The overall performance of the recognizer 100 in six different configurations and organized with the string accuracy as a function of the feature type is summarized in Table 1. Table 1 shows, for example, the set HSLPC_{6,3,3} indicates that 6 mel-lpc features are taken from the first resolution, and 3 mel-lpc features are taken from the lower and 3 from the upper band of the second resolution level. The normalized frame energy is included along with the multi-resolution features, and the results represent the features supplemented in all cases by the delta and delta-delta trajectory features. Table 1 illustrates four important results. First, the MSE training is superior to the MLE training and the MSE-based recognizer achieves an average of 55% string error rate reduction, uniformly across all types of speech models, over the MLE-based recognizer. Second, some improvement in performance using subband cepstral features alone (HSLPC_{0,6,6}), compared to the full bandwidth cepstral HSLPC_{ 12,0,0} is also observed. Thirdly, further improvement in recognition performance is obtained when the multi-resolution feature sets are employed as shown in third row of Table 1. Finally, the best result obtained in Table 1 is from use of the features from both resolution levels (HSLPC_{6,3,3}), with a reduction in error rate of 15% when compared with the first resolution feature set alone (HSLPC_{ 12,0,0}). From Table 1, it is noteworthy that the multi-resolution mel-lpc features according to the present invention have been demonstrated to improve recognition on the telephone connected digit database compared to single resolution mel-lpc features. The results in Table 1 are in contrast to previous findings reported by P. McCourt, S. Vaseghi and N. Harte, "Multi-Resolution Cepstral Features for Phoneme Recognition Across Speech Subbands", Proc. ICASSP, 1998, pp. 557–560, where use of both resolution levels is seen to yield no further advantage.

TABLE 1

| Feature Vector Type | Training Scheme | |
| --- | --- | --- |
| | ML Training | MSE Training |
| HSLPC_{12,0,0} | 78.38% | 90.69% |
| HSLPC_{0,6,6} | 79.06% | 91.06% |
| HSLPC_{6,3,3} | 81.65% | 92.10% |

String accuracy rate for an unknown-length grammar-based connected digit recognition task using the ML and MSE training methods as a function of HSLPC feature type.

It is worth noting that the tests run on the trained speech recognizer according to the present invention are very close to actual use speech inputs. So, results similar to the test results of the speech recognizer 100 may be reasonably be expected.

Figure 2:
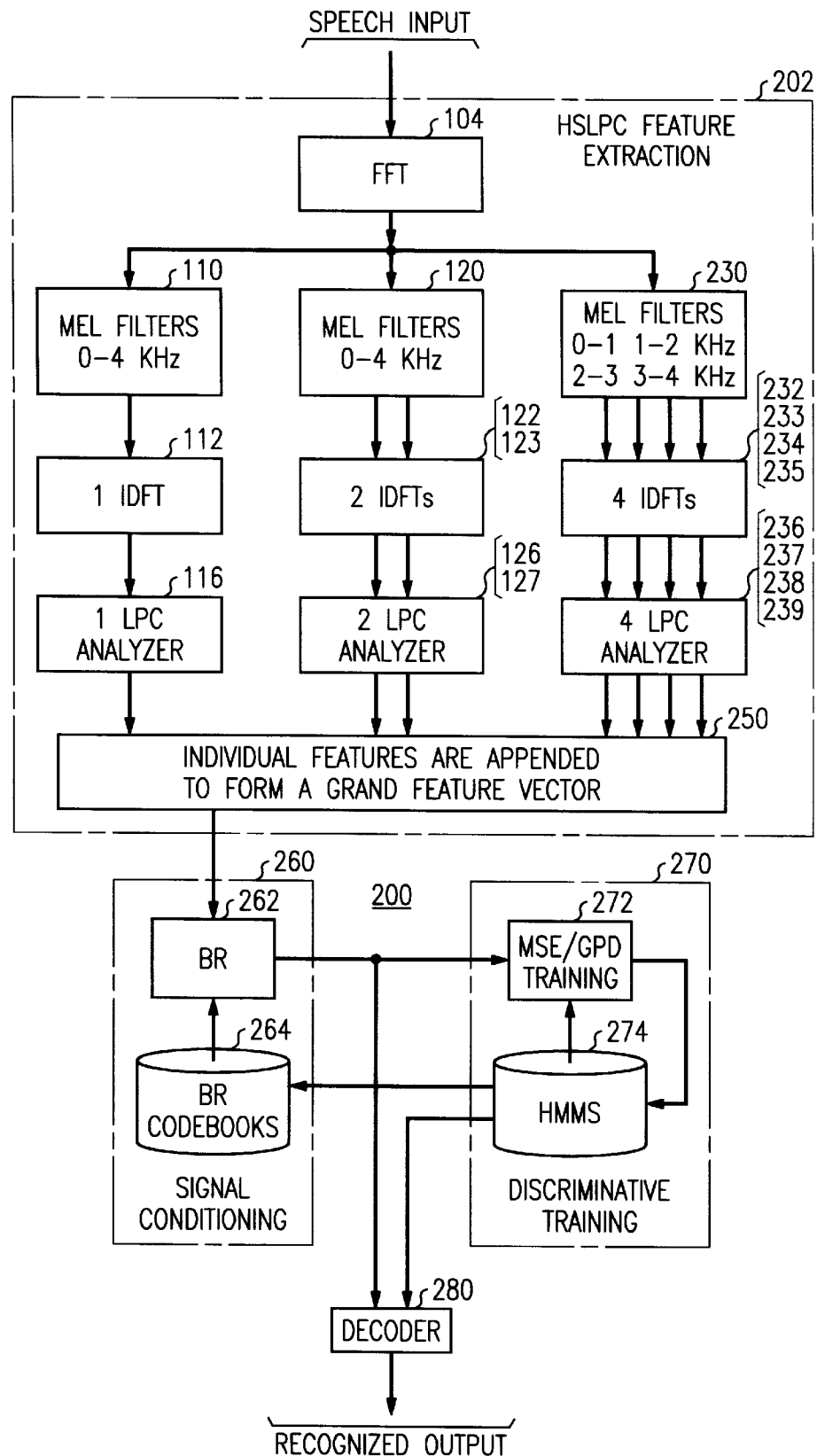
FIG. 2 is a block diagram illustrating the method and apparatus of a speech recognizer for a first, a second and a third level sub-bands according to the invention.

Referring now to FIG. 2, a speech recognizer 200 is shown which is similar to the recognizer shown in FIG. 1 with a level 3 speech recognizer. The speech recognizer 200 is similar to speech recognizer 100 with additional mel filters 230; IDFTs 232, 233, 234 and 235; quad lpc analyzer 236, 237, 238 and 239 subband. For IDFTs 232–235, Q is set to 6 for each sub-band quadrants (0–1 KHz, 1–2 KHz, 2–3 KHz and 3–4 Khz). Higher levels, if added are similarly set. Unit 250 concatenates the multi-level sub-band features to form a single extended feature vector as in unit 150. The final dimension of the concatenated cepstral vector may be at least 12, although test may show some higher number is better.

Thus, there has been disclosed a speech recognizer that extracts cepstral features out of subbands to improve recognition. It is recognized that many modifications and variations will occur to those in the art. For example, a broader speech input band, i.e. greater than 4000 hertz, and different sized subbands may be used. In another example, one of the variables for subband-based recognizers is the number of bands and the exact sub-band boundary decomposition. It is intended that the invention shall include all such variations and modifications that do not exceed the spirit and scope of the attached claims.

What is claimed is:

1. A training method for a speech recognizer comprising the steps of:

receiving a band limited voice input utterance that is time varying;

transforming said utterance using a fast fourier transform process to a frequency domain spectrum;

forwarding said frequency domain spectrum to a plurality of mel filter banks, at least one of said plurality of mel filter banks having a plurality of sub-bands filtering said frequency spectrum;

transforming an output of each of said plurality of mel-filter banks using an inverse discrete fourier transform process to obtain a processed speech output that is time varying from each of said mel-filter banks and an additional time varying output for each sub-band above one for each mel-filter bank;

analyzing each output of each of time varying outputs of each inverse discrete fourier transform process using a respective linear prediction cepstral analysis to produce an individual feature vector output corresponding to each inverse discrete fourier transform output;

appending said individual feature vectors forming a grand feature vector;

conditioning said grand feature vector and removing any bias from said grand feature vector using a bias remover;

performing MSE/GPD training on said grand feature vector after the bias is removed;

building HMMs from said MSE/GPD training; and extracting a bias removal codebook of size four from the mean vectors of said HMMs for use with said bias removal in said signal conditioning of the grand feature vector.

2. The method of claim 1, wherein said transforming step includes pre-emphasizing, blocking speech into frames, frame windowing, and Fourier transformations.

3. The method of claim 1 wherein said mel-filter banks having center frequencies of the filters spaced equally on a linear scale from 100 to 1000 Hz and equally on a logarithmic scale above 1000 Hz.

4. The method of claim 3, wherein above 1000 Hz, each center frequency is 1.1 times the center frequency of the previous filter.

5. The method of claim 4, wherein each filter's magnitude frequency response has a triangular shape in the frequency domain that is equal to unity at the center frequency and linearly decreasing to zero at the center frequencies of any adjacent filter.

6. The method of claim 5 wherein the frequency domain spectrum for each frame is passed through a set of M triangular mel-filter banks, where M is set to 24 for a preferred embodiment.

7. The method of claim 1, wherein inverse discrete Fourier transforms are applied to smooth said frequency spectrum and to yield a plurality of autocorrelation coefficients.

8. The method of claim 7, wherein said plurality of autocorrelation coefficients equals 10 for level 1 and 8 for level 2.

9. The method of claim 1, wherein a final dimension of the cepstral vector is set to 12 cepstral features.

10. The method of claim 9, wherein of said 12 cepstral features 6 features are from a lower subband and 6 features are from an upper sub-band).

11. The method of claim 9 wherein of said 12 cepstral features 6 features are from level 1, 3 features from level 2 lower sub-band and 3 features from level 2 upper sub-band.

12. The method of claim 1, wherein said cepstral vector has at least one feature from level 1 subband, at least one feature from a level 2 subband and at least one feature from a level 3 subband.

13. The method of claim 1, wherein each input feature vector is extended beyond the 12 HSLPC features and the energy feature with the first and second order derivatives thereof resulting in a 39-dimensional feature vector.

14. A speech recognizer comprising:

means for receiving a band limited voice input utterance that is time varying;

means for transforming said utterance using a fast fourier transform process to a frequency domain spectrum;

means for forwarding said frequency domain spectrum to a plurality of mel filter banks, at least one of said plurality of mel filter banks having a plurality of sub-bands filtering said frequency spectrum;

means for transforming an output of each of said plurality of mel-filter banks using an inverse discrete fourier transform process to obtain a processed speech output that is time varying from each of said mel-filter banks and an additional time varying output for each sub-band above one for each mel-filter bank;

means for analyzing each output of each of time varying outputs of each inverse discrete fourier transform process using a respective linear prediction cepstral analysis to produce an individual feature vector output corresponding to each inverse discrete fourier transform output;

means for appending said individual feature vectors forming a grand feature vector;

means for conditioning said grand feature vector and removing any bias from said grand feature vector using a bias remover; and means for decoding said grand feature vector after the bias is removed.

15. The speech recognizer of claim 14 wherein said decoding is performed on said grand feature vector using HMMs; and bias removal codebooks.

16. A speech recognizer method comprising steps of:

receiving a band limited voice input utterance that is time varying;

transforming said utterance using a fast fourier transform process to a frequency domain spectrum;

forwarding said frequency domain spectrum to a plurality of mel filter banks, at least one of said plurality of mel filter banks having a plurality of sub-bands filtering said frequency spectrum;

transforming an output of each of said plurality of mel-filter banks using an inverse discrete fourier transform process to obtain a processed speech output that is time varying from each of said mel-filter banks and an additional time varying output for each sub-band above one for each mel-filter bank;

analyzing each output of each of time varying outputs of each inverse discrete fourier transform process using a respective linear prediction cepstral analysis to produce an individual feature vector output corresponding to each inverse discrete fourier transform output;

appending said individual feature vectors forming a grand feature vector;

conditioning said grand feature vector and removing any bias from said grand feature vector using a bias remover; and decoding said grand feature vector after the bias is removed.

17. The speech recognizer method of claim 16 wherein said decoding step uses HMMs; and bias removal codebooks.

18. The speech recognizer method of claim 16 wherein said bias remover uses cepstral mean subtraction bias removal.

19. The speech recognizer method of claim 16, wherein said bias remover uses hierarchical signal bias removal.

20. The speech recognizer method of claim 16, wherein said bias remover uses cepstral mean subtraction bias removal for some features of the grand feature vector and hierarchical signal bias removal for the remaining features of the grand feature vector.

* * * * *